United States Patent [19]

Shimokai et al.

[11] 4,256,621
[45] Mar. 17, 1981

[54] PAINT COMPOSITION FOR CATHODIC ELECTRODEPOSITION

[75] Inventors: Katzujiro Shimokai, Chiba; Masayuki Kataoka, Ichihara; Akihiko Funamoto, Abiko, all of Japan

[73] Assignee: Nippon Soda Company, Ltd., Ohtemachi, Japan

[21] Appl. No.: 66,580

[22] Filed: Aug. 15, 1979

[30] Foreign Application Priority Data

Sep. 8, 1978 [JP] Japan .................................. 53-109670

[51] Int. Cl.³ .......................... C08L 9/10; C08L 13/02
[52] U.S. Cl. ........................ 260/29.7 NR; 204/181 C; 260/29.2 EP
[58] Field of Search ................ 260/29.2 EP, 29.7 NR

[56] References Cited

U.S. PATENT DOCUMENTS

| | | | |
|---|---|---|---|
| 4,036,795 | 7/1977 | Tominaga | 260/29.2 EP |
| 4,075,148 | 2/1978 | Zatmann | 260/29.7 NR |
| 4,096,106 | 6/1978 | Kita | 260/29.7 NR |
| 4,134,866 | 1/1979 | Tominaga et al. | 260/29.2 EP |

FOREIGN PATENT DOCUMENTS

1206796  9/1970  United Kingdom ............ 260/29.7 NR

*Primary Examiner*—Edward J. Smith
*Attorney, Agent, or Firm*—George B. Oujevolk

[57] ABSTRACT

A paint composition for cathodic electrodeposition in the form of an aqueous solution or dispersion which is essentially a resin prepared by the reaction of (A) a polymer; (B) an alcohol; (C) an epoxy resin; (D) an amine; and a polyisocyanate. The paint composition is prepared as follows:

(a) first reacting a maleated conjugated diene polymer as an addition reaction compound of a maleic anhydride, with a homopolyer, a random copolymer, a block copolymer or a graft copolymer of a conjugated diene selected from the group consisting of 1,3-butadiene, isoprene, 1,3-pentadiene, chloroprene and cyclopentadiene, said homopolymer or copolymer of the conjugated diene having a number average molecular weight of 200 to 100,000, with (b) an alcohol having the tertiary amino group or a mixture of said alcohol and a monohydroxyl compound having 1 to 18 carbon atoms to obtain a semi-esterified product (B), and second, reacting said product (B) with (c) an epoxy resin having two equivalents or more of epoxy groups in proportion to one equivalent of carboxyl group in said product (B) to obtain a resultant product (C), and third reacting said product (C) with (d) a primary or secondary amine to obtain a resultant product (D), and finally reacting said product (D) with (e) a partially blocked polyisocyanate having intramolecularly two or less of free isocyanate groups and one or more of blocked isocyanate groups in one molecule; and, (f) further neutralizing the resultant resin with an acid to render the resultant resin soluble or dispersible in water.

4 Claims, No Drawings

PAINT COMPOSITION FOR CATHODIC ELECTRODEPOSITION

DETAILED EXPLANATIONS FOR THE INVENTION

The present invention relates to a paint composition for cathodic electrodeposition.

As a conventional electrodepositing paint resin, an aqueous soluble anionic resin has been hitherto used, in other words, a resin having generally an acid group for example, a maleated oil, a maleate polybutadiene resin, an alkyd resin or resin containing a copolymer of acrylic acid monomer or methacrylic acid monomer as a main component is neutralized with a base involving ammonia, organic amine, caustic soda or caustic potash and thereby the said aqueous soluble anionic resin is obtained and has been hitherto used.

In the event of using the aqueous soluble anionic resin for the electrodepositing coating procedure, the aqueous soluble anionic resin is made to contact with an electroconductive anode and an electroconductive cathode and by feeding an electric current on the cathode and the anode, a film of the coating composition is produced on the anode.

According to this anodic sediment type of electrodepositing coating process, a coating metal objective is anodically polarized and consequently, one part of the metal objective, as a metal cation is eluted in the foregoing electrodepositing coating step.

Particularly, in the event of treating the metal to be coated with a phosphate salt for anticorrosive purposes, one part of the phosphate salt film coating is eluted or stripped and consequently, the phosphate salt coated film is reduced to a thin film and in some cases the metal surface of the coated metal is exposed. So, deterioration of the anticorrosive coatings are frequently observed. Further, one part of the eluted metal is intermingled in the electrodeposited film and as its result, the electrodeposited film is stained and coloured. For example, if the metal to be coated is iron, a white coated film is stained and coloured with a brownish colour, if the metal is aluminum, the white coated film is stained with yellowish colour.

As a result, the metal ion in the coated film acts to greatly deteriorate the anti corrosive effect of the electrodeposited film.

In the event of carrying out the electrodeposition coating process for a long time, the eleted metal ions are accumulated in the electrodeposition bath and the stability of the electrodeposition bath is greatly impaired.

Further, a resin film component obtained with "the anodic sediment type of electrodepositing coating process" consists of an acidic resin having an acid group, so that the electrodeposited films have weak resistance to corrosive action with a base compound, particularly to corrosion action with an alkaline compound. If the electrodepositing coating process can be carried out by using the metal to be coated as the cathode for the sake of improving foregoing drawbacks, the elution of the metal and the elution and separation of the phosphate salt film by the surface treatment can be prevented and further, the staining colouration of the electrodeposited film by the eluted metal ion and the pollution of the electrodepositing bath can be prevented. Thus, it can be expected to raise greatly the anticorrosive effect of the electrodeposited film.

In order to carry out said cathodic sediment type of electrodeposition coating process, it is necessary to use the aqueous soluble resin which generates a cation in its aqueous solution. By feeding an electric current on the cathode and the anode, a film of the coating composition is produced on the cathode. Consequently, in order to obtain the electrodeposition coating resin in conformity to the above purposes, a basic group must be necessarily introduced in the resin which is a main component of the film forming material. The said basic group produces a cation in the water by neutralizing it with an organic acid or an inorganic acid and the sediment of the coating film is produced on the cathode with the electrodepositing coating process, so that so-called "cathodic sediment type of electrodepositing coating process" can be carried out.

Hitherto, various arrangements have been practised as to the cathodic sediment type of electrodepositing paint material for the foregoing process.

For example, a process which comprises treating cationically the reaction compound of epoxy resin and basic amino compound by neutralizing the said reaction compound with an acid (e.g. Japanese Open patent publication No. 103135/1976, Japanese Open patent publication No. 92323/1975, Japanese Open patent publication No. 121640/1977, Japanese Open patent publication No. 77144/1977 and Japanese Open patent publication No. 87498/1977) and another process which comprises producing an acryl resin with a radical copolymerizing step of an acryl monomer having the tertiary amino group with various other acryl monomers or other kinds of monomer(s) and further treating cationically the said acryl resin by neutralizing it with a liquid (e.g. Japanese patent publication No. 37147/1973, Japanese patent publication No. 89851/1970, Japanese Open patent publication No. 103185/1976 and Japanese Open patent publication No. 12996/1978) have been hitherto proposed.

However, the film obtained from the conventional cathodic sediment type of electrodepositing coating material heretofore known as drawbacks as to the surface smoothness and the impact resistance and further the film having a smooth surface and sufficient thickness for practical use, i.e., a thickness of 20 to 25 microns is difficult to obtain and furthermore pigment dispersibility in the electrodeposition paint composition deteriorates. Because of the foregoing drawbacks, it is not yet practically used as an industrial primer of automative body.

Consequently, the object of the present invention is to provide the cathodic sediment type of electrodepositing paint composition which is free from the foregoing drawbacks.

In the other words, the object is to provide a cathodic sedimentation type of electrodeposition paint composition which has a superior aqueous solubility, a favorable throwing power, an enriched pigment dispersibility and a superior bath stability that produces a film having a uniform thickness, superior mechanical strengths as to its impact strength and its bending strength and a high anticorrosive effect.

The inventors carried out extensive research in order to attain all of these objects and as a result, it was discovered that a maleate conjugated diene polymer made to react with a compound having a tertiary amino group and a hydroxyl group, being represented by a general formula:

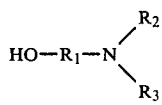

or with a mixture compound of an alcohol having the said tertiary amino group and a monohydric alcohol having 1 to 18 carbon atoms and the resulting mixture is treated with a semi-esterification step (In this specification "semi-esterification" means that one maleic anhydride ring is opened by hydroxyl compound and makes one ester-bond and one carboxyl group.); and the resulting semi-esterified material is made to react with an epoxy resin having two equivalents or more of epoxy group in proportion to one equivalent of carboxyl group of the semi-esterified material and the conjugated diene polymer having an epoxy group is obtained; and the said conjugated diene polymer having the epoxy group is made to react with the primary amine or the secondary amine by an amount of 0.3 to 1.0 equivalent in proportion to one equivalent of residual epoxy group of the said conjugated diene polymer and thereby, the conjugated diene polymer having the basic amino group is obtained; and further, the conjugated diene polymer having the basic amino group is made to react with a partially blocked isocyanate compound having two or less of free isocyanate groups and one or more of blocked isocyanate group(s) in one molecule and thereby, the conjugated diene polymer having the basic amino group, and the blocked isocyanate group is obtained and further it is partially or totally neutralized with an organic acid or an inorganic acid and thus, the cathodic sediment type of electrodepositing paint composition having aqueous solubility, bath stability, pigment dispersibility, good throwing power, superior electrodepositing coating properties, superior film forming nature is obtained and further the film produced has superior impact and bending strengths, where in said general formula, $R_1$ is a divalent hydrocarbon group having 1 to 20 carbon atoms, $R_2$ and $R_3$ are the same or different, denoting a monovalent hydrocarbon group having 1 to 20 carbon atoms and further $R_2$ combined with $R_3$ may denote a divalent hydrocarbon group having 2 to 20 carbon atoms. Thus, the inventors accomplished the present invention.

The essentials of the present invention comprises the cathodic sedimentation type of electrodeposition paint composition and its producing process in which a maleated conjugated diene polymer as a starting raw mateial is made to react with a compound containing a tertiary amino group and a hydroxy group with the epoxy resin and consequently the resulting compound of the conjugated diene polymer containing the epoxy group is made to react with the basic amino compound.

According to the present invention, it has been discovered that the maleated conjugated diene polymer is a very effective component for inproving surface smoothness, impact resistance and the bending strength of the film produced by said cathodic sediment type of electrodepositing paint material, a composition prepared by mixing the reaction products of a conventional epoxy resin and a basic amino compound with an isocyanate compound having blocked isocyanate groups, where an inferior surface smoothness and a deterioration of impact and bending strengths occur from a deficiency of plasticizing component in the film. Further, as a method for improving the foregoing drawbacks, the use of polyalkylene-polyol resin and polyamide resin is well known and compared with those conventional resins the maleated conjugated diene polymer in which there is a carbon-carbon bond such as found in a polybutadiene resin skeleton and which is not subject to hydrolysis and further, it has very superior stability to acids and alkaline material. Further, it has a superior effect for improving poor pigment dispersibility and an inferior chalking property which are drawbacks of the epoxy resin.

Another advantage of the present invention is to use the compound having the basic group and the hydroxy group in a ring opening reaction step of said maleated conjugate diene polymer and as a result, the semi-esterified material containing the tertiary amino group is easily produced and then, said semi-esterified material is made to react additionally with the basic group which is produced with the addition reaction of the epoxy resin and the basic amino compound. Consequently, the cathodic sediment type of electrodeposition paint material which contains, as a fundamental film forming component, the conjugated diene polymer having the basic amino group and the blocked isocyanate group can be easily aqueous-solublized. Thus, the cathodic sediment type of electrodeposition paint composition having superior throwing power and high bath stability can be produced.

The foregoing paint composition can readily be made into an aqueous-solubilized material by neutralizing it with acids and by using the metal to be coated as the cathode, feeding the electric current and carrying out the electrodeposition coating step, the said electrodeposition paint composition can be deposited on the metal.

By heating the electrodeposited film, the blocked isocyanate group is made to react with the amino group and the hydroxy group in a skeleton of the electrodeposition paint material and further by producing a urea bond and a urethane bond, a crosslinking reaction arises and thereby a superior cured film is produced.

The conjugated polymer employable for the present invention comprises a conjugated diene homopolymer or a random copolymer, a block copolymer and a graft copolymer which consist of 50 weight percent or more of one kind or two kinds or more of conjugated diene monomer(s) as a constituent of the polymer chain and a balance weight percent of aromatic vinyl compound(s) or aliphatic vinyl compound(s) as other comonomers.

The conjugated diene comprises 1,3-butadiene, isoprene, 1,3-pentadiene, chloroprene and cyclopentadiene. Further, as the vinyl monomer, an aromatic vinyl compound involving styrene, α-methyl styrene, p-methyl styrene, p-ethyl styrene, p-methoxy styrene and chlorostyrene and an aliphatic vinyl compound involving acrylonitrile, methacrylonitrile, acrylic acid, methacrylic acid, methyl acrylate, methyl methacrylate, ethyl acrylate, ethyl methacrylate, butyl acrylate, butyl methacrylate, 2-ethyl hexyl-acrylate, 2-ethyl hexyl-methacrylate, acrylamide, N-methyl-acrylamide, glycidylacrylate, glycidyl methacrylate, β-hydroxyethyl methacrylate, hydroxy propyl-acrylate, hydroxy propyl-methacrylate, iminol-methacrylate, allylchloride, allyl-glycidyl-ether, diallyl phthalate, itacomic acid and maleic acid are used. Those conjugated diene polymers have been hitherto produced with conventional known processes. A typical manufacturing process comprises performing an anionic polymerization step at a temperature of −70° C. to 100° C. in the presence of an alkalimetal or an organic alkaline compound as a catalyst.

Further, the conjugated diene polymer(s) can also be produced with a cationic polymerization step at a temperature of 0° C. to 100° C. by using Friedel Crafts' catalyst such as aluminum chloride, boron trifluoride or those complex compound(s). The conjugated diene polymers obtained with the foregoing processes contain a high rate of 1,2-double bond as the conjugated diene unit or a high rate of 1,4-double bond as the conjugated diene unit or equal amounts of 1,2-double bond and 1,4-double bond as the conjugated diene unit. All those conjugated diene polymers may be used for the present invention.

The conjugated diene polymers employable for the present invention has a number average molecular weight of 200 to 100,000 preferably 500 to 50,000 and is in a liquid phase at room temperature. The conjugated diene polymer sold in the market comprises Ricon-100, 150 & 157, Lithene-AL, AM & AH, Nisseki-polybutadiene, Nisso-PB B series, Polyoil, Sumika Oil, Flosbren, Buton and Quintol or the like.

The conjugated diene polymer having functional groups(s), employable for the present invention can be easily produced in such manner that in a step of polymerizing the said aliphatic conjugated diene alone or the mixture of the said aliphatic conjugated diene and the said vinyl monomer with a living polymerization procedure, the reactants are treated with carbon dioxide and ethyleneoxide prior to the polymerization interruption and thereby functional groups such as hydroxyl group and carboxyl group are introduced in the terminal of the produced polymer.

The product sold in the market comprises Nisso-PBG series, C series, Hycar, Poly-BD, Teloen and Butarez or the like.

A process for the addition reaction of the said conjugated diene polymer and maleic anhydride can be carried out by utilizing conventional known method. In the event of carrying out the said addition reaction, a process for inhibitting a gelling reaction which comprises adding one kind at least of the compound(s) involving a metal compound of mercaptothiazoles, thiozylsulfenamides, naphthyl-amine derivative, nitrosoamines, phenylene-diamines, naphthols, copper compounds, acetylacetone and pyrogallol or the like in a reaction system is desirably used.

A reaction temperature is chosen in a range of 110° C. to 230° C., desirably in a range of 160° C. to 190° C. in nitrogen atmosphere and its reaction is carried out under an agitating step during 2 to 8 hours. The addition reaction of the maleic anhydride proceeds quantatively with a specified addition rate and in the major cases, it is not necessary to recover the non-reacted, maleic anhydride.

An addition amount of the anhydrous maleic acid is appropriately chosen in a range of 3 to 60 weight percent in proportion to the conjugated diene polymer. If the addition amount of the maleic anhydride is selected in an amount of 3 weight percent or less, a lesser amount alone of the basic amino group is introduced in the conjugated diene polymer and it is difficult to feed the aqueous solubility in the said electrodeposition paint composition. Further, the amount of the epoxy resin is lessened in the skeleton of the electrodeposition fundamental resin and as a result, an expected anticorrosive effect can not be indicated.

On the other hand, if the addition amount of the maleic anhydride is selected at an amount of 60 weight percent or more, the maleated conjugated diene polymer has a very high viscosity and the electrodeposited cured film obtained indicates a poor surface smoothness, a deteriorated impact resistance and an inferior anti-acidity. It is undesirable.

The addition reaction of the maleic anhydride is usually performed in the absence of any solvent, but if necessary, an aliphatic hydrocarbon, for example, fluidal paraffin and petroleum benzine or the like may be used. As an alicyclic hydrocarbon, cyclohexane and isopropyl cyclohexane or the like may be cited. As an aromatic hydrocarbon, benzene and xylene may be cited.

As an esterified compound, ethyl acetate and butyl acetate or the like may be cited.

If those solvents are aqueously insoluble, those solvents are removed with a distilling step under a normal pressure or a reduced pressure after having finished the addition reaction of the maleic anhydride. As the aqueous miscible, organic solvent, for example, acetone, methyl ethyl ketone, dioxane, diethylene glycol dimethyl ether, ethylene glycol-monoacetate and methyl cellosolve acetate or the like may be directly used for the solvent of the electrodeposition paint composition. The acid anhydride group introduced with the foregoing step is made to react with an alcohol having the tertiary amino group and being represented by a general formula:

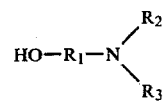

or with a compound mixture of said alcohol and a tertiary amino group and a monohydric alcohol having 1 to 18 carbon atoms by means of a semi-esterification step, wherein $R_1$, $R_2$ and $R_3$ have the meaning heretofore defined. The compound having the hydroxy group and the tertiary amino group comprises, as examples, dimethyl amino ethanol, diethyl amino ethanol, dimethyl aminopropanol, diethyl aminopropanol and dibutyl aminopropanol or the like.

Further the monohydroxyl compound having 1 to 18 carbon atoms comprises saturated or unsaturated alcohol such as methanol, ethanol, propanol, butanol, pentanol, heptanol, octanol, lauryl alcohol, stearyl alcohol, oleyl alcohol, allyl alcohol, and glycol-monoether or glycol-monoester such as ethyleneglycolmonomethylether, ethylenenglycol-monoethylether, ethyleneglycol-monopropylether, ethyleneglycol-monobutylether, ethyleneglycol-monoallylether, ethyleneglycolmonoacetate, ethyleneglycol-monoacrylate, ethyleneglycol-monomethacrylate, propyleneglycol-monoacetate, propyleneglycol-monoacrylate, propyleneglycolmonomethacrylate. Glycol-monoether, especially ethyleneglycol is preferable, because it gives the final resin good water-solubility. And a monohydroxyl compound having an unsaturated double bond is preferable, because it brings a lower curing temperature and good film properties, e.g. film hardness etc which is due to the increase of crosslinkage.

A ring of the acid anhydride group is opened with a reaction of the compound having a hydroxy group and the said acid anhydride group and thereby, a carboxyl group and an ester group are generated. In the event of performing the foregoing reaction, the compound having the hydroxy group is used in an amount of about 0.3 to 1.0 mol and an amount of water of 0.7 to zero mol to one mol of the acid anhydride group. Generally this treatment can be readily carried out in the absence of a solvent, but it can also be carried out in a solvent. The reaction temperature is chosen in a range of 50° C. to 150° C. and the reaction time is selected as 1 to 3 hours and this reaction proceeds easily.

As an epoxy resin for producing an epoxy derivative from the foregoing semiesterified material, according to the present invention, a polyepoxy resin containing two or more of epoxy groups in one molecule is desirably used. Essentially any conventionally known epoxy resin may be used. Out of them, an epoxy resin which is obtained from bisphenol A and epichlorohydrin is preferably used.

The epoxy resin sold generally in the markets Comprises Epikote-828, Epikote-834, Epikote-836, Epikote-1001, Epikote-1004 and Epikote-1007 (Trade Names for products of Shell Chemical Company), Araldite CY-252, Araldite CY-250, Araldite GY-260, Araldite GY-280, Araldite GY-6071, Araldite GY-6084 and Araldite GY-6097 (Trade Names for products of Ciba-Geigy Co., Ltd.), DER-330, DER-331, DER-337, DER-661 and DER-664 (Trade Names for products of the Dow Chemical Co., Ltd.) and Epichlon-800, Epichlon-1010, Epichlon-1000 and epichlon-3010 (Trade Names for products of Dai-Nippon Ink & Chemicals, Inc.).

In so for as the anticorrosive effect may not be impaired, other resins [hereinafter denoted as (a)(b)(c)(d)(e)(f)(g)(h)(i)(j) & (k)] by an amount of about 60 weight parts or less may be used in the combination with 100 weight parts of above mentioned epoxy resin.

(a) A novolak type of epoxy resin which comprises, for example, Epikote-152 and Epikote-154 (Trade Names for products of Shell Chemical Company), DEN-431, DEN-438 and DEN-439 (Trade Names for products of the Dow Chemical Co., Ltd.), EPN-1138 (Trade Name for product of Ciba-Geigy Co., Ltd.) and Epichlon N-740, Epichlon N-680, Epichlon N-695, Epichlon N-565 and Epichlon N-577 (Trade Names for products of Dai-Nippon Ink & Chemicals, Inc.).

(b) A hydrogenated resin of bisphenol A-diglycidyl ether which comprises, for example, Adeka Resin EP-4080 (Trade Name for product of Asahi Denka Kogyo K.K.).

(c) A resin of bisphenol A-side chain type of diglycidyl ether which comprises, for example, Adeka Resin EP-4000 (Trade Name for product of Asahi Denka Kogyo K.K.).

(d) A urethane denatured epoxy resin which comprises, for example, Adeka Resin EPU-4, Adeka Resin EPU-6 and Adeka Resin EPU-8 (Trade Names for products of Asahi Denka Kogyo K.K.).

(e) A resorcin-diglycidylether-epoxy resin which comprises for example, SUMI-epoxy ELR-130 and SUMI-epoxy ELR-150.

(f) A glycidyl ester type of epoxy resin which comprises, for example, Araldite CY-183 and Araldite CY-182 (Trade Names for products of Ciba-Gligy Co., Ltd.), Epikote E-190 and Epikote E-871 (Trade Names for products of Shell Chemical Co., Ltd.), Showdain S-729, Showdain S-540 and Showdain S-550 (Trade Names for products of Showa Denko K.K.) and Epichlon-200, Epichlon-400 and Epichlon-1400 (Trade Names for products of Dai-Nippon Ink & Chemicals, Inc.).

(g) An ester resin of diglycidyl ether-P-hydroxybenzoate which comprises, for example, SUMI-epoxy resin and ELP-160.

(h) An alicyclic epoxy resin which comprises ERL-4221, ERL-4289, ERL-4206, ERL-4234 and ERL-4205 (Trade Names for products of U.C.C.), CY-179, CY-178, CY-180 and CY-175 (Trade Names for products of Ciba-Geigy Co., Ltd.) and CX-221, CX-289, CX-206, CX-301 and CX-313 (Trade Names of Chisso Co., Ltd.).

(i) A linear aliphatic epoxy resin which comprises, for example, BF-1000 (Trade Name for product of Nippon Soda Co., Ltd.) and Oxiron-2000, Oxiron-2001 and Oxiron-2002 (Trade Names for products of FMC Corporation).

(j) A methyl substition type of epoxy resin which comprises, for example, Epichlon-830, Epichlon-800, Epichlon-200, Epichlon-400 and Epichlon-4030 (Trade Names for products of Dai-Nippon Ink & Chemicals, Inc.).

(k) A glycidylamine type epoxy resin which comprises, for example, SUMI-Epoxy ELM-120 and SUMI-Epoxy ELM-125. Those other varous resins may be used.

The reaction of the semi-esterified material and the epoxy resin is carried out at a reaction temperature of 100° C. to 250° C., desirably at a temperature of 130° C. to 190° C.

Usually, its reaction time is selected in a range of 1 to 8 hours and particularly, it is most appropriately chosen in a range of 2 to 5 hours. Them reaction comprises mainly a reaction of a oxirane ring with a carboxyl group and further, it generates an ester bond, where a hydroxyl group is simultaneously produced from the ester residue. An amount of the epoxy resin is selected so that 1.5 to 10 parts of the oxirane ring may be proportional to one part of the carboxyl group. If less than 1.5 equivalent(s) of the oxirane ring in proportion to one part of the carboxyl group, as a molar number of the oxirane ring is used, the resulting reaction compound is produced as a high molecular material and its viscosity is greatly raised and in some occasion, a gelling phenomenon arises. So, this is undesirable. On the other hand, if more than 10 parts of the oxirane ring are used in an excess of the maximum limit, a large residual amount of the non-reacted epoxy resin is left over and the electrodepositted cured film has a poor surface smoothness and an inferior impact resistance and further, dispersibility of the pigment, i.e. a component of the electrodeposition paint composition and a stability of the electrodepositing bath are deteriorated.

In order to accelerate the reaction of the carboxyl group with the oxirane ring and to prevent an undesirable rise of the viscosity or a gelling phenomenon which occur with a thermal polymerization of the conjugated diene polymer, the reaction may be accelerated by adding an accelerator in the reaction system. The acceler employable for this purpose comprises, for example, 2-ethyl imidazole, tetraethyl ammonium bromide, benzyl dimethyl amine, triethylene diamine, triethylamine, diethylamine, butylamine, choline chloride, caustic potash and alkali carbonate or the like. The accelerator(s) by an amount of 0.01 to 5 molar percent, proportional to the molar unit of the oxirane ring is added in the reaction system. Further, in order to inhibit completely the thermal polymerization, a radical polymerization inhibitor in an amount of 100 to 1,000 ppm, involving, for example, hydroquinone, para-benzoquinone and anthraquinone or the like may be added in the reaction system.

An atmosphere around the reaction system may be an inert gas and further, by carrying out the reaction in the presence of air, the thermal polymerization for a part of double bond between carbon-carbon can be more securely inhibitted.

Then, the conjugated diene polymer having the epoxy group obtained is made to react with the primary amine or the secondary amine and thereby, the conjugated diene polymer having the basic amino group is produced.

As the primary—or the secondary—amine compound(s) employable for the present invention, for example, the primary amine involving propylamine, butylamine, monoethanol amine, monopropanol amine, ethylene diamine and hexa methylene diamine and a polyamine involving diethylene triamine, triethylene tetramine, tetraethylene pentamine, propylene diamine, dipropylene triamine, butylene diamine, dimethyl-aminoethyl-amine, dimethylaminopropylamine, dibutylaminopropylamine, diethylamino-propylamine, hydroxyamino-propylamine, piperozine, N-methyl-piperazine and N-amino-ethyl-piperazine and the secondary amine involving dimethylamine, diethylamine, dipropylamine, dibutylamine and those higher homologous compounds or those isomers are cited out. Further, a cyclic secondary amine involving ethyleneimine, morpholine and piperidine and di-lower alkyl-amine having hydroxyl group involving diethanolamine, dipropanol amine, dibutanol amine, those isomers and those higher homologous compounds are cited out as the secondary amine.

According to the present invention, the primary amine or the secondary amine or a mixture consisting of the secondary amine and a small amount of the primary amine or the polyamine is preferably used.

The aforementioned aliphatic amine, together with an aromatic amine involving aniline, N-methyl-aniline, toluidine, benzyl amine, m-xylene-diamine, metaphenylene-diamine or 4.4'-diamino-diphenyl-methane may be used. But the amount used is preferably selected so that its aqueous dispersibility may not be impaired in a step of neutralizing the amine addition compound with an acid.

In the event of using the polyamine, it must be cautious that the gelling phenomenon may not arise. The amount used is limited so that it may not hinder remarkably a reaction equivalent of active hydrogen (i.e. the hydrogen in the hydroxy and amino group) being reacted with a free isocyanate group in a step of performing the addition reaction with a partially blocked isocyanate, described later and with a free isocyanate group in another step of heating, curing the electrodeposited film.

As another process for obtaining the conjugated diene polymer having the basic amino group, the epoxy resin is made to react firstly with the basic amino compound and in this occasion, and active hydrogen of the basic amino compound by an amount of 0.3 to 0.8 equivalent, preferably by an amount of 0.4 to 0.6 part in proportion to one part of the oxirane ring is used for the reaction.

The addition reaction compound of epoxy resin-amine having a residual oxirane ring produced may be made to react with a carboxyl group of the semi-esterified material. The reaction of the conjugated diene polymer having the epoxy group with the basic amino compound proceeds with a mixing step alone or both reactants at common temperature and thereby an exothermal reaction arises. In order to finish completely this addition reaction, this reaction system is better heated in the final step at a temperature of 50° C. to 150° C., preferably at a temperature of 70° C. to 130° C.

The amount used of the amine compound which is reacted with the conjugated diene polymer having the epoxy group is selected so that the cathodic sediment type of electrodeposition paint composition may be sufficiently aqueous solubilized at a step of solubilizing aqueously the said composition with the acid.

In the event of using a monoamino compound, a residual occurrence of nonreacted monoamino compound must be prevented so that the monoamino compound by an amount of 0.5 to 1.0 mol in proportion to one part of the oxirane ring is preferably used.

In the event of using a polyamino compound, the gelling phonomenon must be prevented so that the polyamino compound an amount of 0.7 mol or more in proportion to one part of the oxirane ring is used and further, a solution of the conjugated diene polymer having the epoxy group is preferably dropped in a solution of the polyamino compound.

The reaction compound of the conjugated diene polymer having the epoxy group with the basic amino compound obtained should have an amine value of 30 to 350 particularly an amine value of 50 to 150. In so far as this specified amine value is maintained, the reaction compound, after its neutralizing step with the acid, is able to have a superior aqueous solubility, an excellent aqueous dispersibility, a favorable bath stability and a good throwing power.

Further, the electrodeposited cured film has a superior anticorrosive effect and a high impact resistance.

Subsequently, the conjugated diene polymer having the basic amino group and the blocked isocyanate group for use of the present invention is generally synthesized with two reaction procedures as follows:

(1) A polyisocyanate compound is made to react with an isocyanate blocking agent and thereby, a partially blocked isocyanate compund containing two or less free isocyanate groups and one or more of blocked isocyanate group(s) in one molecule is obtained.

(2) The said partially blocked isocyanate compound obtained is made to react with the conjugated diene polymer containing the basic amino group and the said active hydrogen atom.

But, on this occasion, by means of selecting an equivalent ratio of active hydrogen atom proportional to the isocyanate group, i.e. the isocyanate group produced with a thermal dissociation step of the said blocking agent, in an appropriate amount, the cured film having a balanced crosslinked density can be obtained. In the other words, the electrodeposited film having superior balances in a solvent resistance, an impact resistance and a bending strength can be obtained.

The partially blocked isocyanate compound for the use of the present invention is a polyisocyanate compound in which its free isocyanate group is partially blocked.

For example, it comprises a partially blocked diisocyanate compound having one free isocyanate group and one blocked isocyanate group or a diisocyanate compound having one free isocyanate group and two blocked isocyanate groups or a diisocyanate compound having two free isocyanate groups and one blocked isocyanate group.

The foregoing three kinds of the partially blocked isocyanate compounds are manufactured with a common blocking reaction process in which the polyisocyanate compound is made to react with the blocking agent by commonly using the blocking agent in an amount of about 0.3 to 0.7 in proportion to one isocyanate group of the polyisocyanate compound.

In other words, the said polyisocyanate compound is made to react with above specified amount of the blocking agent in the presence of an inert solvent or in the absence thereof at a common temperature of 40° C. to 160° C., preferably at a temperature of 80° C. or less, if necessary in the presence of a catalyst and thereby the partially blocked isocyanate compound(s) can be obtained.

As the inert solvent for above mentioned reaction, for example, any solvent which is employable for the blocking reaction of the isocyanate compound may be all used.

For example, an ester(s) involving ethyl acetate and butyl acetate, a ketone(s) involving methyl ethyl ketone and methyl isobutyl ketone, an ether(s) involving diethyl ether and cellosolve acetate and an aromatic hydrocarbon(s) involving benzene and acetone may be used.

As the catalyst for the use of the partially blocking reaction, a common catalyst employable for the blocking reaction of conventional isocyanate compound is used. For example, a tertiary amine (e.g. triethylamine, triethylene diamine and N-methyl morpholine or the like) and an organic metal compound(s) (e.g. tin octylate, line octylate, lead octylate, calcium naphthenate, dibutyl-tin-dilaurate and tetrabutyl-1,3-diacetoxy-distannoxy-acid or the like) are cited out.

Sometimes, a residue of non-reacted, free polyisocyanate compound remains or the secondary compound containing a totally blocked isocyanate group is produced in the partially blocked reaction compound. According to the present invention, the partially blocked polyisocyanate compound containing the residue and the secondary compound, sometimes, may be directly used, but as a principle, the partially blocked polyisocyanate compound is preferably removed, for example by an extraction step a distilling step, a chromatography process, a precipitation step or a filtering step.

The amount of blocking agent employed for the partial blocking reaction is usually selected at an amount of 0.3 to 0.8 mol proportion to one isocyanate group of the polyisocyanate compound. Further, desirably in order to remove the residue of non-reacted, free polyisocyanate compound and the compound containing the totally blocked isocyanate group from the partially blocked reaction compound, i.e. the objective compound, the amount of blocking agent used is selected as about 0.4 to 0.6 mol.

The polyisocyanate compound employable for the present invention may be any conventional polyisocyanate compound which is obtained with the addition reaction step of a surplus amount of the isocyanate compound with a lower molecular polyol.

The isocyanate compound involves, for example, ethylene diisocyanate, propylene diisocyanate, tetramethylene diisocyanate, hexamethylene diisocyanate, decamethylene diisocyanate, dodecamethylene diisocyanate, 2,4,4-trimethylhexamethylene-1,6-diisocyanate, phenylene diisocyanate, tolylene diisocyanate, naphthylene diisocyanate, 4,4-methylene-bis(phenyl isocyanate), 4,4'-ethylene-bis(phenyl isocyanate), $\omega,\omega'$-diisocyanate-1.3-dimethyl benzene, $\omega,\omega'$-diisocyanate-1.4-dimethyl benzene, $\omega, \omega'$-diisocyanate-1.3-dimethyl cyclohexane, 1-methyl-2.4-diisocyanate cyclohexane, 4,4'-methylene-bis(cyclohexyl isocyanate), 4,4'-methylene-bis(cyclohexyl isocyanate), 4,4'-ethylene-bis(cyclohexyl isocyanate), 3-isocyanate-methyl-3,5,5-trimethyl cyclohexyl isocyanate, dimer acid-diisocyanate, $\omega,\omega'$-diisocyanate-diethyl benzene, $\omega,\omega'$-diisocyanate-dimethyl toluene, $\omega,\omega'$-diisocyahate-diethyl toluene, fumaric acid-di(2-isocyanate ethyl) and triphenylmethane-trisocyanate.

The lower molecular polyol comprises, for example, ethyleneglycol, propyleneglycol, 1,3-butylene glycol, neopentyl glycol, 2,2,4-trimethyl-1,3-pentane diol, hexamethylene glycol, cyclohexane dimethanol, hydrogenated bisphenol-A, trimethylol propane, trimethylol ethane, 1,2,6-hexane triol, glycerine, sorbitol, sucrose, pentaerytritol and the like.

The di- or poly-isocyanate obtained with the foregoing addition reaction i.e., a polyisocyanate having a biuret structure, and a polyisocyanate having an allophanate bond or the like are cited as the polyisocyanate compounds employable for the present invention.

Out of those polyisocyanate compounds the diisocyanate and the triisocyanate are preferably used.

As the blocking agent to the employable objective of the present invention, a conventional blocking agent for a blocking reaction of the isocyanate compound may be used. For example, a phenol type of blocking agent, a lactam type of blocking agent, an active methylene type of blocking agent, an alcohol type of blocking agent a mercaptan type of blocking agent, an amide type of blocking agent, an imide type of blocking agent, an amine type of blocking agent, an imidazole type of blocking agent, an urea type of blocking agent, an imine type of blocking agent, an oxime type of blocking agent or a sulfite type of blocking agent are cited.

As a practical example, the following blocking agents are exemplified:

A phenol type of blocking agent:
phenol, cresol, xylenol, nitrophenol, chlorophenol, ethylpherol, t-butylphenol, hydroxy-benzoic acid, hydroxy-benzoate ester or 2.5-di-t-butyl-4-hydroxytoluene.

A lactam type of blocking agent:
$\epsilon$-caprolactam, $\delta$-valerolactam, $\gamma$-butyrolactam, or $\beta$-propiolactam.

An active methylene type of blocking agent:
diethyl malonate, dimethyl malonate, ethyl acetoacetate, methyl acetoacetate or acetylacetone.

An alcohol type of blocking agent:
methanol, ethanol, n-propylalcohol, isopropyl alcohol, n-butyl alcohol, isobutyl alcohol, t-butyl-alcohol, n-amyl-alcohol, t-amyl-alcohol, lauryl alcohol, ethyleneglycol-monoethyl-ether, ethyleneglycol-monoethyl-ether, ethyleneglycol-monobutyl-ether, diethyleneglycol-monomethyl-ether, diethyleneglycol-monoethyl-ether, propyleneglycol-monomethyl-ether, methoxy methanol, glycocholic acid, glycolate ester, latic acid, lactate ester, methylol urea, methylol melamine, diacetate alcohol, ethylene chlorohydrin, ethylene bromohydrin, 1.3-dichloro-2-propanol,-hydroperfluoro alcohol or acetocyanohydrin.

A mercapten type of blocking agent:
methyl-mercaptan, hexylmercaptan, t-butylmercaptan, t-dodecylmercaptan, 2-mercaptobenzothiazole, thiophenol, methyl thiophenol or ethylthiophenol.

An acid amide type of blocking agent:
acetoanilide, acetoamisidine, acetotoluide, acrylamide, methacrylamide, acetic acid amide, stearic acid amide or benzamide.
An imide type of blocking agent:
succinimide, phthalimide or malenimide acid,
An amine type of blocking agent:
diphenyl amine, naphthyl amine, xylidine, N-phenyl xylidine, carbazole, aniline, naphthyl amine, butylamine, dibutylamine or butylphenylamine.
An imidazole type of blocking agent:
imidazole, 2-ethylimidazole or the like.
An urea type of blocking agent:
urea, thiourea, ethylene urea, 1,3-diphenyl urea or the like.
A carbamate salt type of blocking agent:
phenyl ester of N-phenyl carbamic acid, 2-oxazolidone or the like.
An imine type of blocking agent:
ethylene imine or the like.
An oxime type of blocking agent:
formaldoxime, acetoaldoxime, acetoxime, methyl ethyl ketoxime, diacetyl monoxime, benzophenoneoxime, cyclohexanone oxime or the like.
A sulfite salt type of blocking agent:
sodium bisulfite, potassium bisulfite or the like.

Out of these blocking agents, the lower alcohols, the oximes and the lactams are preferably used, because the polyisocyanate blocked with those blocking reagent(s) causes a crosslinking reaction by removing the blocking reagent(s) at somewhat lower temperature.

Then, the partially blocked isocyanate compound having two or less of free isocyanate group and one or more of blocked isocyanate group in one molecule, obtained is made to react with the conjugated diene polymer having the basic amino group and containing the active hydrogen atom.

This reaction proceeds easily at a temperature that a dissociation of the blocked isocyanate group does not occur, in other words, at a temperature of 40° C. to 160° C., desirably at a temperature of 50° C. to 120° C. with 1 to 4 hours of heating step. Thus, the free isocyanate group is combined with the hydroxy group or the amino group of the conjugated diene polymer containing the basic amino group and foregoing combination step is carried out through the medium of a urethane bond or urea bond.

Further, a sequence of this reaction can be replaced, in other words, firstly, an epoxy resin is made to react with the basic amino compound and the addition reaction compound of the epoxy resin and the amine is obtained and the said addition reaction compound is made to react with the partially blocked isocyanate compound and then the resulting reaction compound is made to react with the semi-ester compound. Thus, the same result is obtained.

A reactant ratio for this reaction, in the other words, an equivalent ratio of the free isocyanate group of the partial blocked isocyanate compound in proportion to one equivalent of the active carbon atom of the conjugated diene polymer having the basic amino group is selected as a ratio range of 0.2 to 2, desirably as a ratio range of 0.4 to 1.5.

In order to solubilize or disperse aqueously the conjugated diene polymer having the basic amino group, and the block isocyanate in water, the conjugated diene polymer is neutralized and thereby, a cation group is generated.

A neutralizing agent for above mentioned neutralizing step and an aqueous solubilizing treatment is desirably selected from a reagent that a residual neutralizing component dissociated from the resin salt may be consumed or disposed and may not remain in the cured film in the course of baking the electrodeposited film after its filtering step and its rinsing step alone. Consequently, the said neutralizing agent is selected from one kind or two kinds or more of aliphatic monocarboxylic acid having a boiling point of 200° C. or less, desirably a boiling point of 120° C. or less at ordinary pressure and hydrochloric acid, otherwise, a mixture which consists of the aliphatic monocarboxylic acid having a boiling point of 200° C. to 260° C. at ordinary temperature and another monocarboxylic acid having a boiling point of 200° C. or less, desirably a boiling point of 120° C. or less at ordinary pressure is used.

As the said aliphatic monocarboxylic acid having a boiling point of 200° C. or less at ordinary pressure, those aliphatic saturated monocarboxylic acids involving, for example, formic acid, propionic acid, butyric acid and valeric acid are cited.

Further, as the said aliphatic monocarboxylic acid having a boiling point of 200° C. to 260° C. at ordinary pressure, those aliphatic monocarboxylic acids involving caproic acid, heptanoic acid, caprylic acid and pelargonic acid or the like can be exemplified.

In some occasion, an olefinic monocarboxylic acid can be used.

The amount used of the neutralizing agent must be sufficient so that the resin may be aqueously solubilized or dispersed and desirably, it is less than one part of said resin. The aqueous electrodepositing composition obtained thereto has a pH of 3 to 9, desirably a pH of 5 to 7 and a resin concentration of the said electrodepositing composition has a concentration of 3 to 30 weight percent desirably a concentration of 5 to 15 weight percent.

The electrodepositing paint composition by the present invention can be solubilized or dispersed in water without using a surfactant or a wetting agent. Further, a solvent having affinity with water may be used without causing any obstacle.

The electrodepositing resin composition by the present invention may be used as a clear paint, but in major cases, a pigment composition is dispersed in a dispersed solution of resin composition. The pigment composition comprises a coloring pigment blended usually, an anticorrosive pigment and a body pigment. Citing some examples, the colsuring pigment involving iron oxide, lead oxide, carbon black and titanium oxide, the anticorrosive pigment such as strontium chromate and the body pigment involving purified kaolin and barium sulfate in the appropriate combination thereof are used.

An amount of the pigment composition in the dispersed solution is usually denoted by a ratio of the pigment in proportion to the resin. The said ratio of the pigment proportional to the resin by the present invention is usually chosen in a range of 0.01/1.0 to 5.0/1.0.

The resin composition by the present invention is sufficiently quickly and perfectly cured without using a curing catalyst, because the amino group in the resin acts as a catalyst. Further, in order to carry out perfectly the curing step, a catalyst dissociating the blocked isocyanate compound, a catalyst forming the urethane bond and an oxide type of curing catalyst may be blended in the said resin composition.

The catalyst for dissociating the blocked isocyanate compound comprises, for example, dibutyl-tin-oxide, phenyl-tin-chloride, dibutyl-tin-bromide, dibutyl-tin-dicetate, tributyl-tin-laurate, tetrabutyl-1.3-diacto diacto-di-stannoxane, hexabutyl-di-stonnoxane, zinc stearate, zinc octylate, cobalt naphthenate, N,N,N'N'-tetramethyl-ethylene diamine and trimethyl diamine or the like.

As the catalyst for producing urethane bond, may conventional catalyst for the reaction of the isocyanate compound with the compound containing reactive hydrogen atom may be all used for the present invention.

Its typical organic tin catalyst comprises stannous octonoate, stannous oleate, dibutyl-tin-dioctoate and dibutyl-tin-laurate or the like.

Further, its tertiary organic amine catalyst comprises triethylamine, triethylene diamine, N,N,N',N'-tetramethyl ethylene diamine, N,N,N',N'-tetraethylethylene diamine, N-methyl morpholine, N-ethyl morpholine, N,N,N',N'-tetramethyl guanidine, N,N,N',N'-tetramethyl-1.3-butane diamine, N,N-dimethyl ethanolamine and N,N-diethyl-ethonol amine or the like. The oxide type of curing catalyst comprises metal salts which involve for example an acetate salt (or, naphthenate salt, oleate salt, chromate salt, or phosphate salt) of bismuth, lead, tin, iron, cobalt, nickel, aluminium, zinc, manganese or zirconium.

Those catalysts by an amount of 0.05 to 5 weight percent in proportion to the resin composition of the present invention are usually used.

Further, another neutral or cationic, aqueous soluble resin which has a compatible solubility with the electrodepositing paint composition, in so far as the said neutral or cationic resin may not impair the anticorrosive property, may be blended in the electrodepositing paint composition of the present invention.

As an aqueous soluable material, another resin, for example, a resin of methylolphenol, a resin of methylolmelamine, polyacrylamide, polyvinyl pyrrolidone, polyvinyl acetate, or a reaction compound of a copolymer containing dialkylaminoethyl- or dialkyl aminopropyl-methacrylate and the secondary amine are used.

The foregoing cathodic sediment type of electrodepositing paint composition is diluted with a deionized water and vat-bathed so that it may contain an appropriate amount (for example, about 12 weight percent) of solid component and then, the metal is coated by electrodeposition by a specified electric charge condition in a bath having a specified temperature and the resulting coated objective product is taken out from the said bath and it is rinsed with a filtrate solution and then, it is treated with a baking step.

The electrodepositing coating condition comprises usually, a bath temperature of 10° C. to 35° C., an applied electric voltage of about 10 to 500 V, an electric current density of about 1.0 to 115 ampere/sq. foot and an electric charging time of about 10 to 300 seconds whereby the electrodepositing coating step is carried out.

The electrodeposited film may have an appropriate thickness in compliance with a quality of the electrodepositing paint composition and above mentioned electrodepositing coating condition and usually the said film has a thickness in the range of 20 to 30 micron.

The said aqueous electrodepositing paint composition is made to contact with an electroconductive anode and an electroconductive cathode and thereby, the electric current is charged in the said cathode and the said anode and a surface of the said cathode is coated with the electrodepositing paint composition. Various kinds of materials such as metals involving particularly steel, aluminium, copper, magnesium or the like are suitable for the coated electroconductive cathode.

Generally, in iron surface is preliminarily treated with a phosphate salts involving zinc phosphate, calcium phosphate or iron phosphate and the said electrodepositing paint composition is suitable for coating those treated steel plates and even if a hexavalent chrome compound is not used, a satisfactory anticorrosive property can be obtained for it. Further, a carbon plate is desirably used for the electroconductive anode. The filtrate solution which is usually supplied for an ultrafiltration step in common electrodepositing coating procedures may be used and particularly, it is not limited.

The coated film precipitated upon the cathode is baked and cured by heating it in an oven having usually a temperature of 90° C. to 260° C., desirably a temperature of 160° C. to 220° C. or irradiating it with infrared ray. In the curing step, the blocking isocyanate group in the electrodepositing paint resin discharges an alcohol as a blocking agent and the said alcohol is made to react with an amine group, an amide group and a hydroxy group in the said resin with a crosslinking reaction and thereby a superior film is produced on it.

The electrodeposited film which is obtained with the cathodic sediment type of electrodepositing paint composition by the present invention can be finished with a finishing coating step by using an intermediate coating material and a finishing coating material in conformity with what is necessary.

In this occasion, the intermediate paint material and the finishing material may be appropriately selected from paints of natural drying type, coercive drying type, thermal heat curing type and powder coating material in conformity to its requirement.

Further, the composition by the present invention may be used as an aqueous paint material or on aqueous adhesive agent.

Subsequently, the present invention is more minutely explained by referring to Examples, but the present invention is not defined limitedly by those Examples.

In the Examples, "part" and "percent (%)" all mean "part by weight" and "weight percent (%)".

Further, comparison Examples are quoted after paragraphs of the Examples and by comparing effects of both Example, i.e. "comparison Examples" and "Example", it is manifested that the present invention is superior.

EXAMPLE 1

A sodium dispersed material was added in tetrahydrofuran containing dissolved 1,2-diphenyl benzene and butadiene was added in the resulting tetrahydrofuran and thereby a living polymerization reaction solution was produced. The living polymerization reaction solution was treated with carbon dioxide and thereby a butadiene polymer (Trade Name: Nisso-PBC-1000, Product of Nippon Soda Co., Ltd.) having 1,550 as a number average molecular weight (hereinafter, it is abbreviated as molecular weight), a fine structure consisting of 90.5 percent of 1,2-vinyl bond and 9.5 percent of 1,4-trans bond, 59.7 of acid value (this is denoted as KOH mg/one gram of 100% resin and the same denotation will be used hereinafter) and carboxyl group at molecular end is produced. 1,000 parts of the butadiene polymer, 70 parts of maleic anhydride, 3.0 parts of di-tert-amyl hydroquinone and 11 parts of xylene were treated with a heating step at 190° C. of temperature during 8 hours in nitrogen atmosphere and thereby a maleated polybutadiene (1-A) having 113 of acid value was obtained.

The addition ratio of the maleic anhydride was 9.9 percent of rate. 1,000 parts of the said reaction compound (1-A) was blended with 65 parts of diethylaminoethanol and the resulting mixture was heated at a temperature of 80° C. to 90° C. with a simultaneous agitating step. In the course of about two hours, an infrared absorption spectrum of the reaction compound erased an absorption of acid anhydride ring in 1970 cm$^{-1}$ of domain, whereas a new absorption on the basis of each ester and acid appeared in 1700 cm$^{-1}$ and 1720 cm$^{-1}$ of domain, thus, the semi-esterified material (1-B) having 81.7 of acid value and 3.01 of amine value was obtained.

1,000 parts of the semi-esterified material (1-B), 1,110 parts of condensation type of epoxy resin of bisphenol A-epichlorohydrin (hereinafter, this is called as the epoxy resin alone), i.e. epikote (Trade Name for product of Shell Chemical Co.), 11 parts of choline chloride and 1,055 parts of cellosolve acetate were charged in a reactor vessel and the resulting mixture was heated at a temperature of 130° C. to 140° C. with a simultaneous agitating step. The addition reaction of oxirane ring and carboxyl group was pursued by investigating a residual carboxyl group. This reaction was perfectly finished during 4 hours. As the resulting reaction compound, a polybutadiene (1-C) containing epoxy group and having 2.2 percent of epoxy oxygen content rate and 3 of acid value was obtained.

Then, the said reaction compound (1-C) was kept at 80° C. of temperature and 351 parts of diethylamine was dropped in it during 30 minutes. Further, its reaction was carried out at 100° C. of temperature in the course of two hours and thereby a polybutadiene derivative (1-D) containing the basic amino group and having 78.1 of amine value was obtained.

On the other hand, 174 parts of tolylene diisocyanate consisting of 80 percent of 2,4-TDI and 20 percent of 2,6-TDI and 53 parts of butylacetate ester were charged in a reaction container and those reactants were kept at 60° C. of temperature under a nitrogen atomsphere and 91.5 parts of methyl ethylketoxime was dropped in it in the course of two hours and further, its reaction was carried out during two hours and thus, the partial blocked isocyanate compound (1-E) was obtained.

Then, 19.8 parts of the said partial blocked isocyanate compound (1-E) was dropped in 100 parts of the said polybutadiene derivative (1-D) containing the basic amino group and its reaction was carried out at 70° C. of temperature during one hour.

Thus, the electrodepositing paint composition (1-F) of the polybutadiene having the basic amine group, and the block isocyanate, containing 72.3 percent of solid component and having 65.2 of amine value was obtained.

EXAMPLE 2

33 Parts of diethyl-amino ethanol and 33 parts of butyl cellosolve were added in 1,000 parts of the maleated polybutadiene (1-A) obtained in Example 1 and the resulting mixture was heated at a temperature of 80° C. to 90° C. with a simultaneous agitating step.

In the course of above two hours, as to the infrared absorption spectrum of the reaction compound, an absorption of the acid anhydride ring was erased in 1700 cm$^{-1}$ of domain and new absorptions based on each ester and an acid appear respectively in 1700 cm$^{-1}$ of domain and 1720 cm$^{-1}$ of domain. Thus, the semi-esterified material (2-B) having 81.3 of acid value and 15.1 of amine value was obtained.

1,000 parts of the semi-esterified material (2-B), 1,110 parts of the epoxy resin, i.e. Epikote-828 (Trade Name for Product of Shell Chemical Co., Ltd.), 1.1 parts of choline chloride and 1.055 parts of cellosolve acetate were charged in a reaction container and those reactants were heated at a temperature of 130° C. to 140° C. with the simultaneous agitating step.

The addition reaction of the oxirane ring with the carboxyl group was pursued by measuring an addition amount of the residual carboxyl group. The reaction was perfectly finished in the course of four hours. Thus, the polybutadiene (2-C) having 2.2 percent of content rate of the epoxy oxygen and 2.5 of acid number was obtained.

The said reaction compound (2-C) was maintained at 80° C. of temperature and 340 parts of diethylamine was dropped in it during 30 minutes and further, the reaction was carried out during two hours and the polybutadiene derivative (2-D) containing the basic amino group and having 74.1 of amine value was obtained.

On the other hand, 174 parts of tolylene diisocyanate consisting of 80 percent of 2,4-TDI and 20 percent 2,6-TDI, and 53 parts of butyl acetate ester were charged in the reaction container and those reactants were kept at 60° C. of temperature under the nitrogen atmosphere and 91.5 parts of methyl ethyl-ketoxime was dropped in it during two hours and further, its reaction was performed during two hours and thus, the partial blocked isocyanate compound (2-E) was obtained.

19.8 parts of the said partial blocked isocyanate compound (2-E) was dropped in 100 parts of the polybutadiene derivative (2-D) containing the basic amino group and its reaction was carried out at 70° C. of temperature during one hour. Thus, the electrodepositing paint composition (2-F) of the polybutadiene containing the basic amino group, and the block isocyanate group having 61.9 of amine value and 72.0 percent of the solid component content rate was obtained.

EXAMPLE 3

1,000 parts of the semi-esterified material (1-B) obtained in Example 1, 2,830 parts of the epoxy resin, i.e. Epikote-1001 (Trade Name for product of Shell Chemical Co.), 19.2 parts of choline chloride and 1,915 parts of cellosolve acetate were charged in a reaction container and those reactants were heated at a temperature of 130° C. to 140° C. with the simultaneous agitating step. The addition reaction of the oxirane ring with the carboxyl group was persued by measuring an amount of the residual carboxyl group. The reaction was completely finished during 4 hours.

Thus, the polybutadiene containing the epoxy group (3-C), having 1.2 percent of content rate of epoxy-oxygen and 2.7 acid number was obtained as the reaction compound.

The reaction compound (3-C) was kept at 80° C. of temperature and 351 parts of diethyl amine was dropped in it during 30 minutes and further, its reaction was carried out at 100° C. of temperature during two hours. Thus, the polybutadiene derivative (3-D) containing the basic amino group and having 47.4 of amine value was obtained.

On the other hand, 174 parts of tolylene diisocyanate consisting of 80 percent of 2,4-TDI and 020% of 2,6-TDI and 53 parts of butyl acetate were charged in the reaction container and those reactants were kept at 60° C. of temperature under the nitrogen atmosphere and 91.5 parts of methyl ethyl-ketoxime was dropped in it during two hours and further, the reaction was carried out during two hour and thus, the partial blocked isocyanate compound (3-E) was obtained.

22.8 parts of the said partial blocked isocyanate compound (3-E) was dropped in 100 parts of the said polybutadiene derivative (3-D) containing the basic amino group and its reaction was carried out at 70° C. of temperature during one hour. Thus, the polybutadiene electrodepositing paint composition (3-F) containing the basic amino group, and the block isocyanate group, having 38.6 of amine value and 74.5 percent of content rate of the solid component was obtained.

EXAMPLE 4

1,000 parts of the semi-esterified material (2-B) obtained in Example 2, 2,819 parts of the epoxy resin, i.e. Epikote-1001 (Trade Name for product of Shell Chemical Co.), 19 parts of choline chloride and 1,910 parts of cellosolve acetate were charged in the reaction container and those reactants were heated at a temperature of 130° C. to 140° C. with the simultaneous agitating step. The addition reaction of the oxirane ring with the carboxyl group was pursued by measuring an amount of the residual carboxyl group. The said reaction was completely finished during four hours. Thus, the polybutadiene containing the epoxy group (4-C) having 1.2 percent of content rate of epoxy oxygen and 2.0 of acid value was obtained as the reaction compound.

The said reaction compound (4-C) was kept at 80° C. of temperature and 350 parts Of diethyl-amine was dropped in it during 30 minutes and further, its reaction was carried out during two hours and thus, the polybutadiene derivative (4-D) containing the basic amino group and having 45.0 of amine value was obtained.

On the other hand, 174 parts of tolylene diisocyanate consisting of 80 percent of 2,4-TDI and 20 percent of 2,6-TDI and 53 parts of butyl acetate ester were charged in the reaction container and those reactants were kept at 60° C. of temperature under the nitrogen atmosphere and 91.5 parts of methyl ethylketoxime was dropped in it during two hours and further, its reaction was carried out during two hours. Thus, the partial blocked isocyanate compound (4-E) was obtained. Then, 22.8 parts of the partial blocked isocyanate compound (4-E) was dropped in 100 parts of the said polybutadiene derivative (4-D) having the basic amino group and its reaction was carried out at 70° C. of temperature during one hour. Thus, the polybutadiene electrodepositting paint composition (4-F) containing the basic amino group, and the blocked isocyanate, having 36.6 of amine value and 76.7 percent of content rate of solid component was obtained.

EXAMPLE 5

A sodium despersion was added in tetrahydrofuran containing the dissolved 1,2-diphenyl benzene and butadiene was added in above system at −60° C. of temperature and thereby a solution of living polymerization reaction was obtained and further, it was hydrolyzed. Thus, a butadiene polymer (Nisso-PB-1000: Trade Name for product of Nippon Soda Co., Ltd.) having 1,250 of molecular weight and a micro structure consisting of 90.7 percent of 1,2-vinyl bond and 9.3 percent of 1,4-trans bond was obtained. 1,000 parts of the said butadiene lower polymer, 150 parts of maleic anhydride, 3 parts of di-tertamylhydroquirone and 11 parts of xylene were thermally treated at 190° C. of temperature during 8 hours under the nitrogen atmosphere and thus, the maleated polybutadiene having 143 of acid value (5-A) was obtained.

An addition ratio of the maleic anhydride was 12.5 percent of rate.

155 parts of diethyl-amino ethanol was added in 1,000 parts of above reaction compound (5-A), i.e. the maleated polybutadiene and the resulting mixture was heated at a temperature of 80° C. to 90° C. with the simultaneous agitating step.

In the course of about two hours, as to the infrared absorption spectrum of the reaction compound, an absorption of the acid anhydride was erased in 1,700 $cm^{-1}$ of domain and new absorptions based on the ester and the acid appeared respectively in 1,700 $cm^{-1}$ of domain and 1720 $cm^{-1}$ of domain. Thus, the semi-esterified material (5-B) having 65.3 of acid number and 58.5 of amine number was obtained.

Then, 1,000 parts of the semi-esterified material (5-B), 886 parts of the epoxy resin, i.e. Epikote-828 (Trade Name for product of Shell Chemical Co., Ltd.), 9.4 parts of choline chloride and 943 parts of cellusolve acetate were charged in the reaction container and those reactants were heated at a temperature of 130° C. to 140° C. with the simultaneous agitating step. The addition reaction of the oxirane ring with the carboxyl group was pursued by measuring the amount of the residual carboxyl group. The reaction was completely finished during 4 hours. Thus, a polybutadiene containing the epoxy group having 2.0 percent of content rate of epoxy oxygen and 2.1 of acid value was obtained as the reaction compound (5-C).

Then, the said reaction compound (5-C) was kept at 80° C. of temperature and 281 parts of diethylamine was dropped in it during 30 minutes and further, its reaction was carried out at 100° C. of temperature during two hours and thus, the polybutadiene derivative (5-D) containing the basic amino group and 84.3 of amine value was obtained.

On the other hand, 174 parts of tolylene diisocyanate consisting of 80 percent of 2,4-TDI and 20 percent of 2,6-TDI and 53 parts of butylacetate ester were charged in the reaction contained and those reactants were kept at 60° C. of temperature under the nitrogen atmosphere and 91.5 parts of methyl ethyl-ketoxime was dropped in it during two hours and further, its reaction was carried out during two hours. Thus, the partial blocked isocyanate compound (5-E) was obtained. 17.9 parts of the said partial blocked isocyanate compound (5-E) was dropped in 100 parts of the said polybutadiene derivative (5-D) containing the basic amino group and the reaction was carried out at 70° C. of temperature during one hour. Thus, the polybutadiene electrodepositing paint composition (5-F) containing the basic amino group, and the blocked isocyanate group having 71.5 of amine value and 71.8 percent of content rate of solid component was obtained.

EXAMPLE 6

78 parts of diethylamino-ethanol and 78 parts of butyl cellosolve were added in 100 parts of the said reaction compound (5-A) obtained in Example 5 and those reactants were heated at a temperature of 80° C. to 90° C.

with the simultaneous agitating step. In the course of about two hours, as to the infrared absorption spectrum of the reaction compound, the absorption of the acid anhydride was erased in 1790 cm$^{-1}$ of domain and new absorptions based on each ester and an acid appeared in 1700 cm$^{-1}$ of domain and 1720 cm$^{-1}$ of domain. Thus, the semi-esterified material (6-B) having 65.2 of acid value and 29.3 of amine value was obtained.

1,000 parts of the said semi-esterified material (6-B), 885 parts of the epoxy resin, i.e. Epikote-828 (Trade Name for product of Shell Chemical Co., Ltd.), 9 parts of choline chloride and 943 parts of cellosolve acetate were charged in the reaction container and those reactants were heated at a temperature of 130° C. to 140° C. with the simultaneous agitating step.

The addition reaction of the oxirane ring with the carboxyl group was pursued by measuring an amount of the residual carboxyl group. The reaction was completely finished during 4 hours. Thus, the polybutadiene containing the epoxy group and having 2.0 percent of content rate of epoxy oxygen and 2.3 of acid value was obtained as the reaction compound (6-C). Then, the reaction compound (6-C) was kept at 80° C. of temperature and 280 parts of diethylamine was dropped in it during 30 minutes and the reaction was carried out at 100° C. of temperature during two hours and thus, the polybutadiene derivative (6-D) containing the basic amino group having 72.3 of amine value was obtained.

On the other hand, 174 part of tolylene diisocyanate consisting of 80 percent of 2,4-TDI, 20 percent of 26-TDI and 53 parts of butyl acetate ester were charged in the reaction container and those reactants were kept at 60° C. of temperature under the nitrogen atmosphere and 91.5 part of methyl ethyl-ketoxime was dropped in it during two hours and further, its reaction was carried out during two hours. Thus, the partial blocked isocyanate compound (6-E) was obtained. 17.9 parts of the said partial blocked isocyanate compound (6-E) was dropped in 100 parts of the said polybutadiene derivative (6-D) containing the basic amino group and the reaction was carried out at 70° C. of temperature during one hour. Thus, the polybutadiene electrodepositing paint composition (6-F) containing the basic amino group, denatured with the blocked polyisocyanate, having 61.3 of amine value and 71.8 percent of content rate of solid component was obtained.

EXAMPLE 7

1,000 parts of the semi-esterified material (5-B) obtained in Example 5, 2,260 parts of the epoxy resin, i.e. Epikote-1001 (Trade Name for product of Shell Chemical Co.), 16 parts of choline chloride and 1,630 parts of cellosolve acetate were charged in a reaction container and those reactants were heated at a temperature of 130° C. to 140° C. with the simultaneous agitating step. The addition reaction of the oxirane ring with the carboxyl group was pursued by measuring a residual amount of the carboxyl group. The reaction was completely finished during 4 hours. Thus, the polybutadiene containing the epoxy group, having 1.1 percent of content rate of epoxy oxygen and 2 of acid number was obtained as the reaction compound (7-C).

Then the said reaction conpound (7-C) was kept at 80° C. of temperature and 280 parts of diethylamine was dropped in it during 30 minutes and further, its reaction was carried out at 100° C. of temperature during two hours. Thus, the polybutadiene derivative (7-D) containing the basic amino group and having 49.2 of amine number was obtained.

On the other hand, 174 parts of tolylene diisocyanate consisting of 80 percent of 2,4-TDI 20 percent of and 2,6-TDI and 53 parts of butyl acetate ester were charged in the reaction container and those reactants were kept at 60° C. of temperature in a nitrogen atmosphere and 91.5 parts of methyl ethyl-ketoxime was dropped in it during two hours and further, the reaction was carried out during these two hours and thus, the partial blocked isocyanate compound (7-E) was obtained.

21.6 parts of the said partial blocked isocyanate compound (7-E) was dropped in 100 parts of the said polybutadiene derivative containing the basic amino group (7-D) and the reaction was carried out during one hour. Thus, the polybutadiene electrodepositing paint composition (7-F) containing the basic amino group, and the blocked isocyanate group, having 40.5 of amine value and 74.1 percent of content rate of the solid component was obtained.

EXAMPLE 8

1,000 parts of the semi-esterified material (6-B) obtained in Example 6, 2,260 parts of the epoxy resin, i.e. Epikote-1001 (Trade Name for product of Shell Chemical Co.), 16 parts of choline chloride and 1,630 parts of cellosolve acetate were charged in the reaction container and those reactants were heated at a temperature of 130° C. to 140° C. with the simultaneous agitating step. The addition reaction of the oxirane ring with the carboxyl group was pursued by measuring the residual amount of the carboxyl group. The said reaction was completely finished during 4 hours. The polybutadiene containing the epoxy group and having 1.1 percent of content rate of epoxy oxygen and 1.4 of acid value was obtained as the reaction compound (8-C).

Then, the reaction compound (8-C) was kept at 80° C. of temperature and 280 parts of diethylamine was dropped in it during 30 minutes and further its reaction was carried out at 100° C. of temperature during two hours. Thus, the polybutadiene derivative (8-D) containing the basic amino group and 40.5 of amine value was obtained.

On the other hand, 174 parts of tolylene diisocyanate consisting of 80 percent of 2,4-TDI and 20 percent of 2,6-TDI and 53 parts of butyl acetate ester were charged in a reaction container and those reactants were kept at 60° C. of temperature in nitrogen atmosphere and 91.5 parts of methyl ethyl-ketoxime was dropped in it during two hours. Further, the reaction was carried out during two hours and thus, the pertial blocked isocyanate compound (8-E) was obtained.

21.6 parts of the said partial blocked isocyanate compound (8-E) was dropped in 100 parts of the polybutadiene derivative (8-D) containing the basic amino group and its reaction was carried out at 70° C. during one hour. Thus, the polybutadiene electrodepositing paint composition (8-F) containing the basic amino group, and the blocked isocyanate group and having 33.3 of amine value and 74.1 parts of content rate of the solid component was obtained.

EXAMPLE 9

1,110 parts of the epoxy resin, i.e. Epikote-828 (Trade Name for product of Shell Chemical Co., Ltd.) and 1,055 parts of cellosolve acetate were charged in a reaction container and those reactants were kept at 80° C. of temperature with the simultaneous agitating step and 351 parts of the diethylamine was dropped in it during 30 minutes and further the reaction was carried out at 100° C. of temperature during two hours. 1,000 parts of the semi-esterified material (1-B) obtained in Example 1 and 11 parts of choline chloride were add in the resulting reaction compound in the said reaction container and those reactants were heated at a temperature of 130° C. to 140° C. with the simultaneous agitating step. The addition reaction of the oxirane ring with the carboxyl group was pursued by measuring the residual amount of the carboxyl group. The reaction was completely finished during 4 hours. Thus, the polybutadiene derivative containing the basic amino group and having 78.1 of amine value was obtained as the reaction compound (9-D).

On the other hand, 19.8 parts of the partial blocked isocyanate compound (1-E) obtained in Example 1 was dropped in 100 parts of the said polybutadiene derivative (9-D) containing the basic amino group and the reaction was carried out at 70° C. of temperature during one hour.

Thus, the polybutadiene electrodepositing paint composition (9-F) containing the basic amino group, and the blocked isocyanate group, having 65.2 of amine number and 72.3 percent of content rate of the solid component was obtained.

EXAMPLE 10

2,260 parts of the epoxy resin, i.e. Epikote-1001 (Trade Name for product of Shell Chemical Co.) and 1,630 parts of cellosolve acetate were charged in the reaction container and those reactants were kept at 80° C. of temperature and 280 parts of diethylamine was dropped in it during 30 minutes with the simultaneous agitating step. Further, the reaction was carried out at 100° C. of temperature during two hours. 1,000 parts of the semi-esterified material (6-B) obtained in Example 6 and 16 parts of choline chloride were added in above reaction compound in above reaction container and those reactants were heated at a temperature of 130° C. to 140° C. with the simultaneous agitating step.

The addition reaction of the oxirane ring with the carboxyl group was pursued by measuring the residual amount of the carboxyl group. The said reaction was completely finished during 4 hours. As the reaction compound, the polybutadiene derivative (10-D) containing the basic amino group and 40.5 of amine value was obtained.

On the other hand, 10.8 parts of the partial blocked isocyanate compound (1-E) obtained in Example 1 was dropped in 100 parts of the said polybutadiene derivative (10-D) containing the basic amino group and its reaction was carried out at 70° C. of temperature during one hour. Thus, the polybutadiene electrodepositting paint composition (10-F) containing the basic amino group, and the blocked isocyanate group, having 36.5 of amine number and 70.0 percent of content rate of solid component was obtained.

EXAMPLE 11

Butadiene was added in a reaction system containing additive, involving sodium benzyl, toluene and n-hexane at 80° C. of temperature and a polymerization reaction solution produced was treated with methanol. Thus, a butadiene polymer (Trade Name: Nisseki L-PB as a product of Nippon Oil Co., Ltd.) having 1,000 of molecular weight and a micro structure of 65 percent of 1,2-vinyl bond was obtained. 1,000 parts of the said butadiene polymer, 150 parts of maleic anhydride, 3 parts of ditert-amyl hydroquinone and 11 parts of xylene were heated at 190° C. of temperature during 8 hours in nitrogen atmosphere. Thus, the maleated polybutadiene (11-A) having 141 of acid value was obtained. The addition ratio of the maleic anhydride was 12.3 percent of rate.

73.5 parts of diethyl-amino ethanol and 73.5 parts of butyl cellosolve were added in 1,000 parts of the said reaction compound (11-A), i.e. the maleated polybutadiene and those reactants were heated at a temperature of 80° C. to 90° C. with the simultaneous agitating step. This reaction was completely finished in the course of two hours. Thus, the semi-esterified material (11-B) having 61.5 of acid number and 30.7 of amine number was obtained. 1,000 parts of the said semi-esterified material (11-B), 835 parts of the epoxy resin, i.e. Epikote-828 (Trade Name for product of Shell Chemical Co.), 9.2 parts of choline chloride and 918 parts of cellosolve acetate were charged in a reaction container and those reactants were heated at 130° C. to 140° C. with the simultaneous agitating step. The addition reaction of the oxirane ring with the carboxyl group was pursued by measuring the residual amount of the carboxyl group. The said reaction was completely finished during four hours. Thus, the polybutadiene having 1.2 of acid value and 1.9 percent of content rate of epoxy oxygen was obtained as the reaction compound (11-C).

Then, the said reaction compound (11-C) was kept at 80° C. of temperature and 264 parts of diethyl amine was dropped in it during 30 minutes and further, its reaction was carried out at 100° C. of temperature during two hours. Thus, the polybutadiene derivative (11-D) containing the basic amino group and having 71.0 of amine value was obtained.

On the other hand, 17.3 parts of the blocked isocyanate compound (1-E) obtained in Example 1 was dropped in 100 parts of the said polybutadiene derivative (11-2) containing the basic amino group and its reaction was carried out during one hour.

Thus, the polybutadiene electrodepositing paint composition (11-F) containing the basic amino group, and the blocked isocyanate group, having 60.5 of amine value and 74.1 percent of content rate of solid component was obtained.

EXAMPLE 12

A reaction system containing additives involving sodium benzyl, toluene and n-hexane was kept at 80° C. of temperature and butadiene was added in it and a polymerization reaction solution produced thereto was treated with methanol and thus, a butadiene polymer (Trade Name: Nisseki L-PB for product of Nippon Oil Co., Ltd.) having 2,000 of molecular weight and 68 percent of content rate of 1.2-vinyl bond was obtained. 1,000 parts of the said butadiene lower polymer, 150 parts of maleic anhydride, 3 parts of di-tert-amyl hydroquinone and 11 parts of xylene were thermally treated at 190° C. of temperature during 8 hours under nitrogen atmosphere and thereby the maleated polybutadiene (12-A) having 140 of acid value was obtained. An addition ratio of the anhydrous maleic acid was 12.2 percent of rate.

73 parts of diethyl-amino ethanol and 73 parts of butyl cellosolve were added in 1,000 parts of above reaction compound (12-A) and the resulting mixture was heated at a temperature of 80° C. to 90° C. with the simultaneous agitating step and in the course of two hours, reaction was completely finished. Thus, the semi-esterified material (12-B) having 61.1 of acid value and 30.5 of amine value was obtained. 1,000 parts of said semi-esterified material (12-B), 830 parts of the epoxy resin, i.e. Epikote-828 (Trade Name for product of Shell Chemical Co.), 9.2 parts of choline chloride and 915 parts of cellosolve acetate were charged in a reaction container and those reactants were heated at a temperature of 130° C. to 140° C. with the simultaneous agitating step.

The addition reaction of the oxirane ring with the carboxyl group was pursued by measuring the residual amount of the carboxyl group. The reaction was completely finished during 4 hours. Thus, the polybutadiene containing the epoxy group and having 1.3 of acid value and 1.9 percent of content rate of epoxy oxygen was obtained as the reaction compound (12-C).

Then, the reaction compound (12-C) was kept at 80° C. of temperature and 263 parts of diethyl amine was dropped in it during 30 minuted and further, its reaction was carried out at 100° C. of temperatures during two hours. Thus, the polybutadiene derivative (12-D) containing the basic amino group and having 70.9 of amine value was obtained.

On the other hand, 17.3 parts of the partial block isocyanate compound (1-E) obtained in Example 1 was dropped in 100 parts of the said polybutadiene derivative (12-D) containing the basic amino group and its reaction was carried out at 70° C. of temperature during one hour. Thus, the polybutadiene electrodepositing paint composition (12-F) containing the basic amino group, and the blocked isocyanate group, having 60.4 of amine value and 74.1 percent of content rate of solid component was obtained.

EXAMPLE 13

1,000 parts of the polybutadiene, i.e. the butadiene lower polymer consisting of 74 percent of Cis-1.4-bond and 24 percent of trans-1.4-bond and having 1,600 of molecular weight (Trade Name: Poly Oil Hüls Co.), 150 parts of maleic anhydride, 3 parts of di-tert-amyl hydroquinone and 11 parts of xylene were thermally treated at 190° C. of temperature during 8 hours under nitrogen atmosphere and thereby, the maleated polybutadiene having 114 of acid value was obtained as the reaction compound (13-A). The addition ratio of the maleic anhydride was 12.6 percent of rate.

75.1 parts of diethyl-amino ethanol and 75.1 parts of butyl cellosolve were added in 1,000 parts of the said reaction compound (13-A) and the resulting mixture was heated at a temperature of 80° C. to 90° C. with the simultaneous agitaging step.

In the course of two hours, this reaction was completely finished. Thus, the semi-esterified material (13-B) having 63.5 of acid number and 31.3 of amine number was obtained.

1,000 parts of the said semi-esterified material (13-B), 862 parts of the epoxy resin, i.e. Epikote-828 (Trade Name for product of Shell Chemical Co.), 9.3 parts of choline chloride and 931 parts of cellosolve acetate were charged in the reaction container and those reactants were heated at a temperature of 130° C. to 140° C. with the simultaneous agitating step. The addition reaction of the oxirane ring with the carboxyl group was pursued by measuring the residual amount of the carboxy group. The reaction was completely finished during 4 hours. Thus, the polybutadiene containing the epoxy group and having 2 of acid value and 1.9 percent of content rate of epoxy oxygen was obtained as the reaction compound (13-C).

Then, the said reaction compound (13-C) was kept at 80° C. of temperature and 271 parts of diethyl amine was dropped in it during 30 minutes and further, its reaction was carried out at 100° C. of temperature during two hours. Thus, the polybutadiene derivative (13-D) containing the basic amino group and having 71.7 of amine value was obtained.

On the other hand, 17.6 parts of the partial blocked isocyanate compound (1-E) obtained in Example 1 was dropped in 100 parts of the polybutadiene derivative containing the basic amino group (13-D) and its reaction was carried out at 70° C. to temperature during one hour. Thus, the polybutadiene electrodepositing paint composition (13-F) containing the basic amino group, and the block isocyanate group, having 61.0 of amine value and 74.2 percent of content rate of solid component was obtained.

EXAMPLE 14

1,000 parts of the maleated polybutadiene (1-A) obtained in Example 1 was blended with 33 parts of diethyl-amino-ethanol and 36.3 parts of hydroxyethylmethacrylate and the resulting mixture was heated at a temperature of 80° C. to 90° C. with a simultaneous agitating step. In the course of about two hours, an infrared absorption spectrum of the said reaction compound erased an absorption spectrum of the said reaction compound erased an absorption of acid anhydride ring in 1790 cm$^{-1}$ of domain, whereas a new absorption on the basis of each ester and acid appeared in 1700 cm$^{-1}$ and 1720 cm$^{-1}$ of domain, thus, the semi-esterified material (14-B) having 82.3 of acid value and 15.8 of amine value was obtained.

On the other hand, 1,604 parts of epoxy resin (i.e., Epikote 834, Trade Name for product of Shell Chemical Co.) and 1935 parts of cyclohexanone were charged in a reaction vessel and the resulting solution was heated at a temperature of 80° C. Secondarily a mixture of 181 parts of diethylamine and 290 parts of diethanolamine was dropped in the reaction vessel in the course of 30 minutes with a simultaneous agitating step. After they are continuously reacted at a temperature of 100° C. in the course of 2 hours, 1,000 parts of the said semiesterified material was charged in the reaction vessel and the resulting mixture was heated at a temperature of 130° C. to 140° C. with a simultaneous agitating step. The addition of oxirane ring and carboxyl group was pursued by investigating a residual carboxyl group. This reaction was perfectly finished during 4 hours. As the resulting reaction compound, a polybutadiene derivative (14-D) containing the basic amino group and having 93.1 of amine value was obtained.

Furthermore, 174 parts of tolylene diisocyanate consisting of 80% of 2,4-TDI and 20% of 2,5-TDI was charged in a reaction vessel and this reaction was kept at 60° C. of temperature under the nitrogen atmosphere and 81.5 parts of n-butanol was dropped in it during two hours, and further its reaction was performed during two hours and thus, the partial blocked isocyanate compound (14-E) was obtained.

33.3 parts of the said partial blocked isocyanate compound (14-E) was dropped in 100 parts of the polybutadiene derivative (14-D) containing the basic amino group and its reaction was carried out at 70° C. of temperature during one hour. Thus, the electrodepositing paint composition (14-F) of the polybutadiene containing the basic amino group, and the blocked isocyanate group, having 60.7 of amine number and 71.5% of the solid component content rate was obtained.

COMPARISON EXAMPLE 1

500 parts of bisphenol A type of epoxy resin having 190 of epoxy equivalent, i.e. Epikote-828 (Trade Name for product of Shell Chemical Co.) was dissolved in 173 parts of cellosolve acetate and the resulting mixture was kept at 60° C. of temperature and 193 parts of diethyl amine was dropped in it. After its exothermal reaction was finished, it was kept at 80° C. of temperature under two hours of agitating step and thus, an adduct of epoxy resin-amine, having 128 of amine value was obtained. 412 parts of the reaction compound (1-E) which was prepared with the same process for producing the partial blocked isocyanate in Example 1 was added in the said adduct. A reaction for the resulting mixture was carried out at 70° C. of temperature during one hour and further, it was diluted with butyl cellosolve until it may contain 70 percent of solid component and (Comparison material-1) was obtained.

COMPARISON EXAMPLE 2

500 parts of bisphenol A type of epoxy resin having 500 of epoxy resin equivalent, i.e Epikote-1001 (Trade Name for product of Shell Chemical Co.) was dissolved in 143 parts of methyl isobutyl-ketone and the resulting mixture was kept at 60° C. of temperature. 73 parts of diethyl-amine was dropped in it and after its exothermal reaction was finished, it was heated at 100° C. of temperature during two hours with the simultaneous, continuous agitating step and thereby, the adduct of epoxy resin-amine was obtained.

470 parts of the partial blocked isocyanate (1-E) which was prepared with the same process set forth in Example 1 was added in the said adduct and its reaction was carried out at 70° C. of temperature during one hour. After the reaction was finished, the resulting reaction compound was diluted with butyl cellosolve so as it may contain 70 percent of solid component. Thus, (Comparison material-2) was obtained.

COMPARISON EXAMPLE 3

190 parts of bisphenol A type of epoxy resin having 190 epoxy resin, i.e. Epikote-828 (Trade Name for product of Shell Chemical Co.) was dissolved in 170 parts of cellosolve acetate and the resulting mixture was kept at 60° C. of temperature.

102 parts of diisopropyl-amine was added in it and after its exothermal reaction was finished, it was heated at 80° C. of temperature with the simultaneous, continuous agitating step. Thus, the adduct of epoxy resin-amine having 121 of amine value was obtained.

On the other hand, 174 parts of tolylene diisocyanate consisting of 80 percent of 2.4-TDI and 20 percent of 2.6-TDI and 53 parts of butyl acetate ester were charged in the reaction container and those reactants were kept at 60° C. of temperature under nitrogen atmosphere and 91.5 parts of methyl ethylketoxime was dropped in it during two hours and further, the reaction was carried out during two hours. Thus, the partial blocked isocyanate compound was obtained.

The said partial blocked isocyanate compound was added in the said adduct of epoxy resin amine and its reaction was carried out at 70° C. of temperature during one hour.

Further, 80 parts of polyamide resin by type of diethylene-triamine-dimer acid, i.e. Barsamide-115 (Trade Name for product of Daiichi General Co., Ltd.) was added and further, the reaction was carried out at 80° C. of temperature for two hours.

In order to evaluate properties of electrodepositing paint compositions obtained with Examples and Comparison Examples, the electrodepositing solutions were prepared with the subsequent condition and thereby the physical properties for the film produced from those electrodepositing solution were compared each other. This comparison results are set forth in Table 1.

PREPARATION(S) FOR THE ELECTRODEPOSITING SOLUTIONS

Those electrodepositing paint compositions containing 80 parts of resinous solid component were taken out from the Examples: 1 to 14 and the Comparison Examples: 1 to 3 and an aqueous solution containing 30 percent of acetic acid was respectively added in those resinous solid components and those pH were adjusted in a range of 5.0 to 5.5.

Then, 20.0 parts of titanium white, 0.2 parts of carbon black and a deionized water were respectively added in them and those additives were dispersed in them with about 20 hours of operation in ball mills).

Those liquid dispersions obtained were diluted with the deionized water to 660 parts of total amount and the said liquid dispersions were adjusted as the electrodepositing paint compositions containing 12 percent of solid component(s).

A carbon plate was fitted as a cathode and a product to be coated, i.e. an iron phosphated treated steel plate (a SPC cold rolled steel plate having about 300 mm of length, 90 mm of width and 0.8 mm of thickness treated with Bondelite #1077, material produced by Japan Parker Rising Co., Ltd.) was fitted as an anode in a vat bath. The electrodepositing coating step was carried out in the vat bath having 30° C. for bath temperature by charging an electric current having a specified voltage. Then, the coated plate was immediately rinsed with the deionized water and further, it was baked at 170° C. of temperature during 30 minutes.

EXPLANATION OF TESTING METHOD

Note-1: A bath having 30° C. of measured temperature was used.

Note-2: An electrodepositing testing sample (NV:10 percent) was collected in a test tube having 18 mm of diameter and it was tightly sealed and it was kept at 40° C. of temperature under an undisturbed state in the course of one week and an aspect for the precipitated layer at its bottom was witnessed.

○—The precipitated layer having soft cake state was able to disperse with a rain-like spraying.

△—The precipitated layer having soft cake state was slightly difficult to disperse with a rain-like spraying.

×—The precipitated layer having hard cake state was difficult to disperse entirely with a rain-like spraying.

Note-3: A necessary electrodepositing voltage to obtain a film thickness of 20±2 micron was set forth in the event of coating the iron phosphate treated steel plate at 30° C. of bath temperature.

Note-4:

○—The coated surface was favorably good.

△—The coated surface was slightly deteriorated.

X—A spotted uneven skin was generated on all coated surface.

Note-5: A film breaking-down hardness was set forth at a measuring time with one kg of load.

Note-6: A height which does not cause any extraordinary deformation on the film was set forth at a measuring time with a load (1.0kg×½″).

Note-7: A diameter of central cylinder rod which does not cause any extraordinary deformation on the film was set forth at a measuring time with 180° C. of bending angle.

Note-8: The test was carried out in accordance with the Specification of JIS (Japanese Industrial Standard)-Z-2371 and an elapsed time for causing 3 mm of widty delaminated on one side of a cross-cut line was set forth, where the iron phosphate coated steel pate was used as a test piece.

Note-9: Each electrodeposited testing sample was dipped in an agitating bath having 35° C. of temperature under an open exposure and a volatile loss component was auxiarily supplied with the deionized water. Then, a thickness of the film electrodeposited with the same condition of Note-3 and its film aspect were set forth.

TABLE 1

Part A

| Examples | 1 | 2 | 3 | 4 | 5 | 6 | 7 | 8 |
|---|---|---|---|---|---|---|---|---|
| Sample Nos. | 1-F | 2-F | 3-F | 4-F | 5-F | 6-F | 7-F | 8-F |
| pH of the Sample | 5.65 | 5.55 | 5.70 | 5.50 | 5.65 | 5.65 | 5.60 | 5.45 |
| Specific resistan($\Omega$/cm) of the Sample | 1005 | 980 | 1125 | 1175 | 990 | 1045 | 1185 | 1080 |
| Pigment dispersibility | O | O | O | O | O | O | O | O |
| Voltage (V) for electrodepositting step | 190 | 190 | 180 | 200 | 210 | 180 | 180 | 190 |
| Electrodepositting time | 2 min. | 2 min. | 2 min. | 2 min. | 2 min. | 2 min. | 2 min. | 2 min. |
| Baking condition (x 30 min) (°C.) | 170 | 170 | 170 | 170 | 170 | 170 | 170 | 170 |
| Film thickness ($\mu$) | 20 | 20 | 20 | 22 | 20 | 22 | 22 | 20 |
| Smoothness of coated film | O | O | O | O | O | O | O | O |
| Pencil hardness | 3H | 4H | 3H | 4H | 2H | 3H | 2H | 2H |
| Impact resistance (Top surface) (cm) | 50 | 50 | 50 | 50 | 50 | 50 | 50 | 50 |
| (Back surface) (cm) | 50 | 50 | 50 | 50 | 50 | 50 | 50 | 50 |
| Bending resistance (mm $\phi$) | 2 | 2 | 2 | 2 | 2 | 2 | 2 | 2 |
| Anticorrosive effect (Hrs) | 650 | 700 | 700 | 650 | 700 | 700 | 650 | 600 |
| Bath stability Film thickness $\mu$ | 20 | 19 | 20 | 19 | 20 | 19 | 19 | 19 |
| Aspect of coated surface | O | O | O | O | O | O | O | O |

TABLE 1

Part B

| Examples | 9 | 10 | 11 | 12 | 13 | 14 |
|---|---|---|---|---|---|---|
| Sample Nos. | 9-F | 10-F | 11-F | 12-F | 13-F | 14-F |
| pH of the Sample | 5.50 | 5.60 | 5.50 | 5.50 | 5.60 | 5.5 |
| Specific resistan($\Omega$/cm) of the Sample | 910 | 1130 | 960 | 990 | 960 | 1380 |
| Pigment dispersibility | O | O | O | O | O | O |
| Voltage (V) for electrodepositting step | 200 | 200 | 190 | 180 | 180 | 180 |
| Electrodepositting time | 2 min. | 2 min. | 2 min. | 2 min. | 2 min. | 2 min. |
| Baking condition (x 30 min) (°C.) | 170 | 170 | 170 | 170 | 170 | 170 |
| Film thickness ($\mu$) | 20 | 20 | 22 | 20 | 20 | 20 |
| Smoothness of coated film | O | O | O | O | O | O |
| Pencil hardness | 3H | 4H | 3H | 2H | 2H | 4H |
| Impact resistance (Top surface) (cm) | 50 | 50 | 50 | 50 | 50 | 50 |
| (Back surface) (cm) | 50 | 50 | 50 | 50 | 50 | 50 |
| Bending resistance (mm $\phi$) | 2 | 2 | 2 | 2 | 2 | 2 |
| Anticorrosive effect (Hrs) | 750 | 750 | 650 | 600 | 650 | 800 |
| Bath stability Film thickness $\mu$ | 20 | 20 | 18 | 16 | 18 | 20 |
| Aspect of coated surface | O | O | O | O | O | O |

TABLE 1

| | Part C | | | |
|---|---|---|---|---|
| Examples | Comparison Example 1 | Comparison Example 2 | Comparison Example 3 | Testing method |
| Sample Nos. | | | | |
| pH of the Sample | 5.30 | 5.50 | 5.40 | Note-1 |
| Specific resistan($\Omega$/cm) of the Sample | 900 | 960 | 851 | Note-1 |
| Pigment dispersibility | x | x | x | Note-2 |
| Voltage (V) for electrodepositing step | 140 | 160 | 140 | Note-3 |
| Electrodepositting time | 2 min. | 2 min. | 2 min. | |
| Baking condition (x 30 min) (°C.) | 170 | 170 | 170 | |
| Film thickness ($\mu$) | 20 | 20 | 18 | |
| Smoothness of coated film | x | x | $\Delta$ | Note-4 |
| Pencil hardness | 3H | 7H | 5H | Note-5 |
| Inpact resistance | | | | |
| (Top surface) (cm) | 10 | 30 | 50 | Note-6 |
| (Back surface) (cm) | 10 | 10 | 40 | |
| Bending resistance (mm $\phi$) | 10 | 6 | 2 | Note-7 |
| Anticorrosive effect (Hrs) | 350 | 400 | 250 | Note-8 |
| Bath stability Film thickness $\mu$ | 4 | 8 | 12 | Note-9 |
| Aspect of coated surface | x | x | $\Delta$ | |

What is claimed is:

1. A paint composition for cathodic electrodeposition in the form of an aqueous solution or dispersion essentially comprising a resin product prepared by:
   (a) first, reacting a maleated conjugated diene polymer as an addition reaction compound of a maleic anhydride with a homopolymer, a random copolymer, a block copolymer or a draft copolymer of a conjugated diene selected from the group consisting of 1,3-butadiene, isoprene, 1,3-pentadiene, chloroprene and cyclopentadiene, said homopolymer or copolymer of conjugated diene having a number average molecular weight of 200 to 100,000, with, an alcohol, having a tertiary amino group or a mixture of said alcohol and a monohydroxy compound having 1 to 18 carbon atoms to obtain a semi-esterified first product;
   (b) second, reacting said first product with an epoxy resin having two equivalents or more of epoxy groups to one equivalent of carboxyl group in said first product to obtain a second product;
   (c) third, reacting said second product with a primary or secondary amine to obtain a resultant third product; and,
   (d) finally reacting said third product with a partially blocked polyisocyanate having intramolecularly two or less of free isocyanate groups and one or more of blocked isocyanate groups in one molecule to obtain a final resultant resin product, and further neutralizing said resultant resin product with an acid to render said resultant resin product soluble or dispersible in water.

2. A paint composition as claimed in claim 1, wherein said alcohol having the tertiary amino group is represented by the formula:

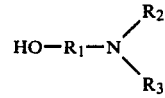

wherein $R_1$ is a divalent hydrocarbon group having 1 to 20 carbon atoms and $R_2$ and $R_3$ are the same or different, denoting a monovalent hydrocarbon group having 1 to 20 carbon atoms or, $R_2$ combined with $R_3$ denotes a divalent hydrocarbon group having 2 to 20 carbon atoms.

3. A paint composition as claimed in claim 1, wherein said homopolymer or copolymer of a conjugated diene is a homopolymer of butadiene or a copolymer of butadiene and an aromatic or aliphatic vinyl monomer.

4. A paint composition as claimed in claim 1, wherein said monohydroxyl compound is one having an unsaturated double bond.

* * * * *

UNITED STATES PATENT AND TRADEMARK OFFICE
CERTIFICATE OF CORRECTION

PATENT NO. : 4,256,621
DATED : March 17, 1981
INVENTOR(S) : Katzujiro Shimokai et al.

It is certified that error appears in the above—identified patent and that said Letters Patent is hereby corrected as shown below:

On The Title Page Item [73] should read

-- Nippon Soda Co., Ltd., Tokyo, Japan and Kansai Paint Co., Ltd., Hyogo-Ken, Japan --.

Signed and Sealed this

Seventh Day of July 1981

[SEAL]

Attest:

RENE D. TEGTMEYER

Attesting Officer

Acting Commissioner of Patents and Trademarks